United States Patent [19]
Riddle et al.

[11] Patent Number: 6,030,030
[45] Date of Patent: Feb. 29, 2000

[54] EXTERIOR BODY SIDE SILL MOLDING ATTACHMENT FOR A MOTOR VEHICLE AND RELATED METHOD

[75] Inventors: Christopher L. Riddle, Westland; Michael J. Marlow, Livonia; Michael J. Bazydlo, St. Clair Shores, all of Mich.

[73] Assignees: Chrysler Corporation, Auburn Hills, Mich.; Textron Automotive Company Inc., Dover, N.H.

[21] Appl. No.: 09/119,932

[22] Filed: Jul. 21, 1998

[51] Int. Cl.⁷ .......................................................... B60J 7/00
[52] U.S. Cl. ............................................ 296/209; 293/128
[58] Field of Search .................... 296/209, 191, 296/185, 189, 901; 293/128

[56] References Cited

U.S. PATENT DOCUMENTS

| | | | |
|---|---|---|---|
| 2,997,329 | 8/1961 | Chapman | 296/191 |
| 3,140,891 | 7/1964 | Shreffler | 280/163 X |
| 3,580,628 | 5/1971 | Rantala | 293/128 X |
| 4,471,992 | 9/1984 | Matsuura et al. . | |
| 4,493,506 | 1/1985 | Alexander . | |
| 4,607,878 | 8/1986 | Itoh . | |
| 4,911,495 | 3/1990 | Haga . | |
| 5,741,044 | 4/1998 | Kawai et al. | 296/203 |

FOREIGN PATENT DOCUMENTS

| | | | |
|---|---|---|---|
| 687605 | 6/1964 | Canada . | |

*Primary Examiner*—D. Glenn Dayoan
*Assistant Examiner*—Lori L. Coletta
*Attorney, Agent, or Firm*—James R. Yee

[57] ABSTRACT

A body side sill molding attachment for a motor vehicle includes a main body portion, first flange and a second flange. The first flange upwardly extends and includes a plurality of ribs adapted to frictionally engage an inboard side of a downwardly extending flange of a motor vehicle sill. The second flange longitudinally extends along an upper edge of the main body portion and includes a plurality of apertures adapted to align with a corresponding plurality of slots provided in the motor vehicle sill. Each of the apertures and associated slots are adapted to align and receive a mechanical fastener for securing an upper edge of the body side sill molding attachment to the vehicle. A preferred method of attaching the body side sill molding attachment to the motor vehicle includes the general step of engaging the ribs of the first flange with the rear side of the downwardly extending sill flange, rotating the body side sill molding attachment about a longitudinally extending axis, abutting the second flange with the motor vehicle sill, and securing the second flange to the motor vehicle sill.

18 Claims, 3 Drawing Sheets

EXTERIOR BODY SIDE SILL MOLDING ATTACHMENT FOR A MOTOR VEHICLE AND RELATED METHOD

BACKGROUND OF THE INVENTION

1. Technical Field

The present invention generally relates to motor vehicles. More particularly, the present invention relates to an exterior body side sill molding attachment for a motor vehicle and a related method of attachment thereof.

2. Discussion

Motor vehicles with common body panels are frequently offered in various trim packages each presenting a distinct exterior appearance. The exterior appearance of the vehicle is often enhanced through distinct front and rear facie. Complementing body side cladding attachments and body side sill molding attachments are also often attached to the vehicle. For example, a base model of the vehicle may be offered without certain ornamental attachments, whereas upgraded models may include different body side cladding attachments and a body side sill molding attachment, among other ornamental features.

A number of techniques are known in the art for attaching ornamental panels such as cladding members to the body of a motor vehicle. For example, loose mechanical fasteners are frequently employed. In other applications, mechanical fasteners are heat staked to the cladding member and adapted to engage apertures provided in the body side panel or other portion of the motor vehicle. It is also known to employ double-sided adhesive tape for at least partially fastening ornamental panels to motor vehicles.

While known techniques for attaching ornamental panels to motor vehicles, including but not limited to those techniques discussed above, have proven to be successful for certain applications, they are all associated with certain disadvantages. In this regard, most known techniques are labor and/or cost intensive. Other known techniques do not securely attach the ornamental panel with the associated motor vehicle and/or do not provide an adequate fit between the ornamental panel and the motor vehicle.

SUMMARY OF THE INVENTION

A general object of the present invention includes providing an improved one-piece sill molding attachment adapted to substantially encapsulate the body side sill of a motor vehicle. Additional objects of the present invention include reducing piece cost and also reducing assembly operations and associated assembly time.

In one form, the present invention provides a method of attaching an exterior body side sill molding member to a vehicle sill having a vertically extending flange and a plurality of slots. The method comprises the general step of providing a one-piece body side sill molding member. The member includes a body portion having first and second edges. The first edge includes a longitudinally extending flange having a plurality of spaced ribs extending substantially perpendicular to its length. The second edge defines a plurality of openings to receive a corresponding plurality of fasteners. The method further includes the general steps of engaging the longitudinally extending flange with the vertically extending flange and rotating the member upward about the vertically extending flange. The method of the present invention further includes the general step of securing an upper edge of the sill molding member to the vehicle.

In another form, the present invention provides a vehicle including a body sill having a downwardly extending flange with an inner side. The vehicle additionally includes a one-piece body side sill molding member including an upper edge and a lower edge. The lower edge is preferably in frictional engagement with the downwardly extending flange and the upper edge abuts the body side sill. The vehicle further includes means for attaching the upper edge to the body side sill.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
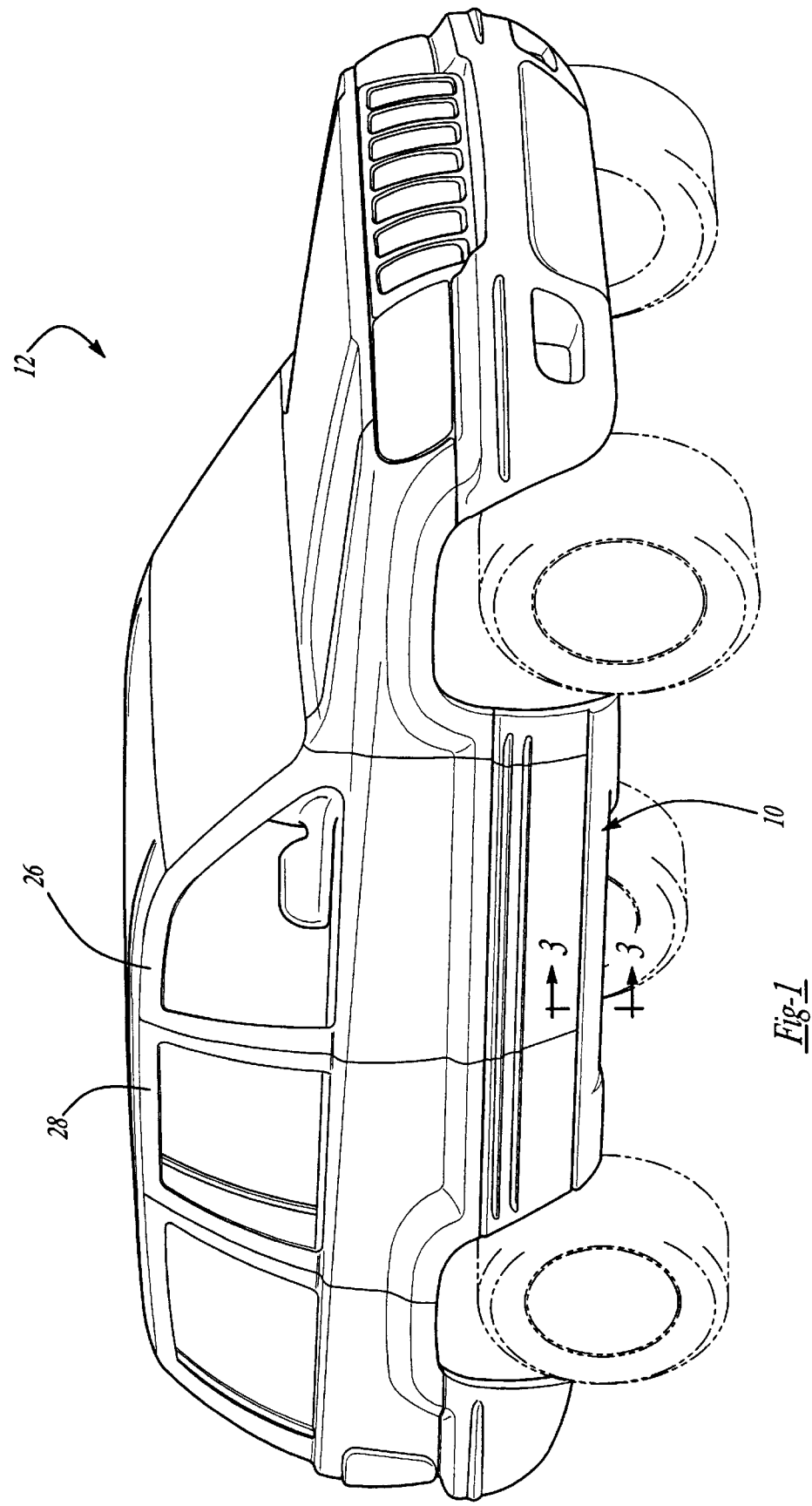
FIG. 1 is an environmental view of an exemplary motor vehicle incorporating a body side sill molding attachment constructed in accordance with the teachings of a preferred embodiment of the present invention.
Figure 2:
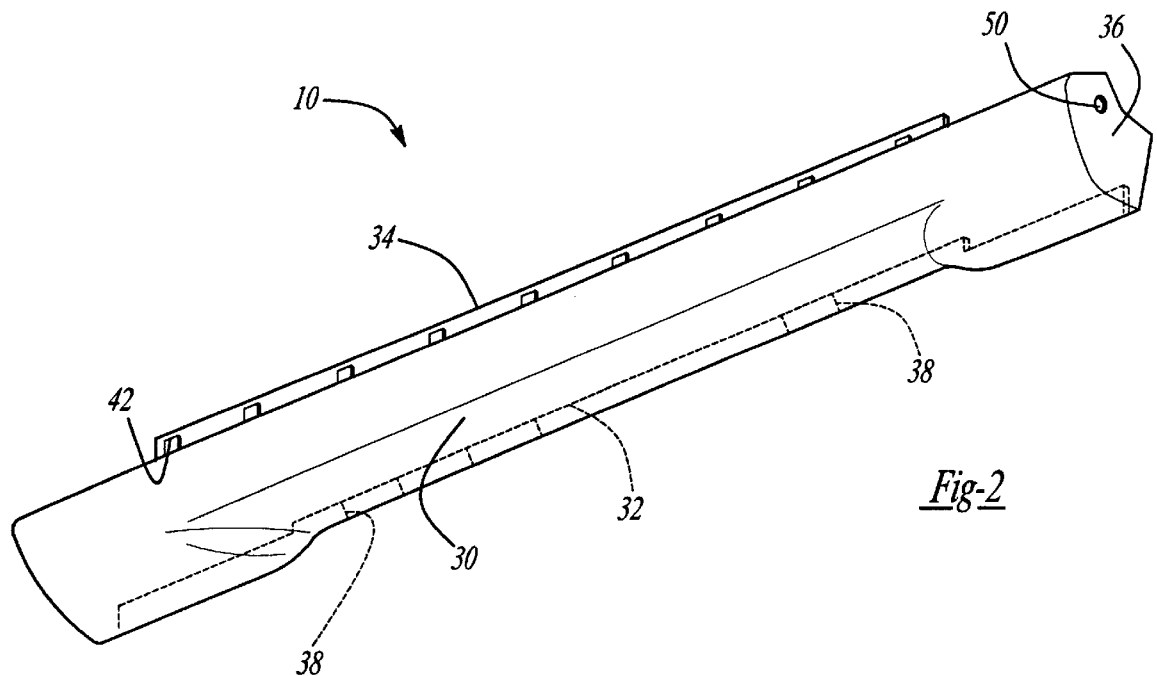
FIG. 2 is an enlarged rear perspective view of the body side sill molding attachment of FIG. 1 shown removed from the exemplary vehicle for purposes of illustration.

With initial reference to FIG. 1, a body side sill molding attachment constructed in accordance with the teachings of a preferred embodiment of the present invention is generally identified with reference numeral 10. The body side sill molding attachment 10 is illustrated operatively attached to a motor vehicle 12. The body side sill molding attachment 10 is preferably a one-piece structure which is injection molded from plastic or other suitable material. It will be understood by those skilled in the art, that the particular motor vehicle 12 shown in the drawings is exemplary in nature and that the teachings of the present invention are applicable for a wide range of vehicles.

Throughout the drawings, the body side sill molding attachment 10 is illustrated attached to a passenger side of the motor vehicle 12. It will be appreciated by those skilled in the art that the teachings of the present invention are equally applicable to the driver's side of the motor vehicle 12. In the exemplary embodiment, the body side sill molding attachment 10 is a substantial mirror image about a longitudinal mid point. As a result, an identical part can be used for both the passenger side and the driver side of the motor vehicle. Alternatively, certain applications may require distinct attachments for the passenger side and driver side.

Figure 3:
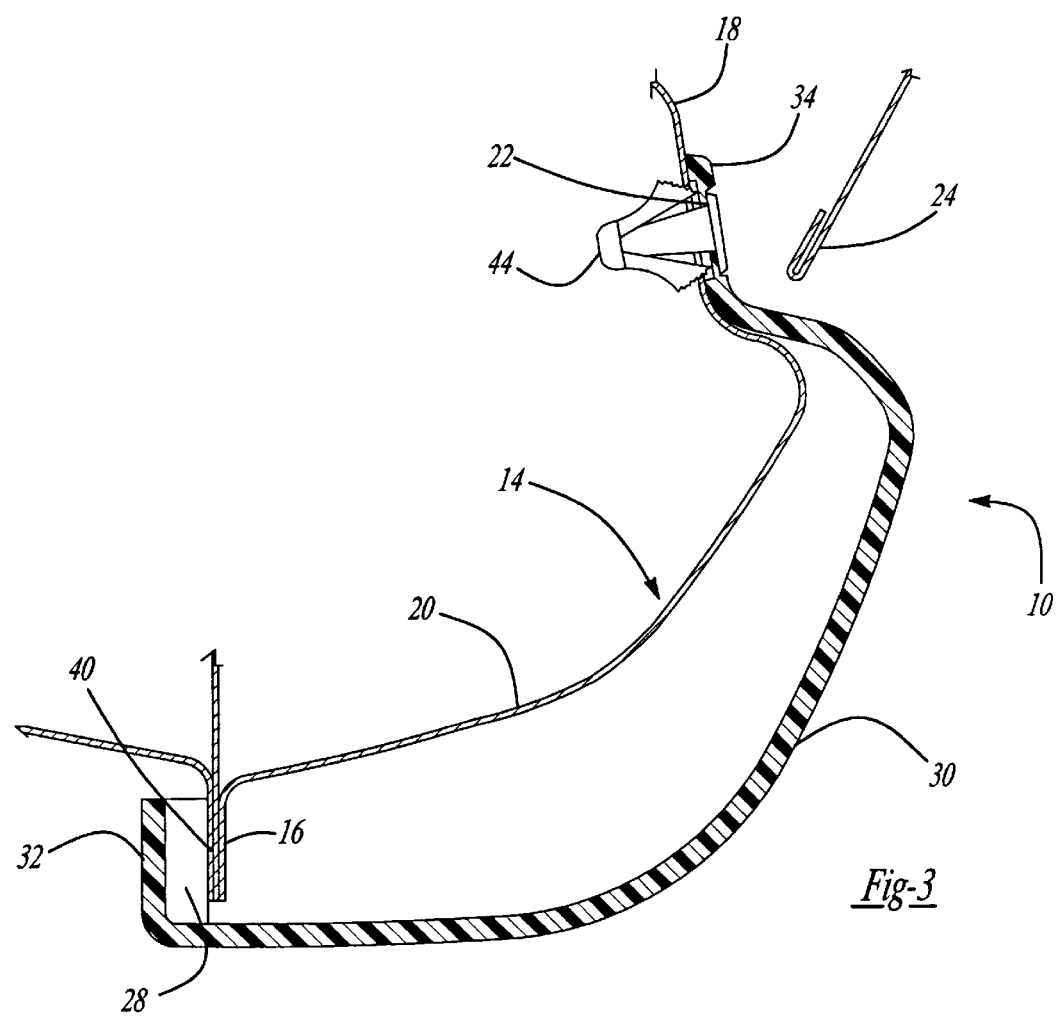
FIG. 3 is a cross-sectional view taken along the line 3—3 of FIG. 1.

With continued reference to FIG. 1 and additional reference to FIG. 3, a brief understanding of the pertinent structure of the exemplary motor vehicle 12 as it relates to the body sill molding attachment is warranted. In this regard, the exemplary motor vehicle 12 is illustrated to conventional include a longitudinally extending sill 14. The sill includes a downwardly extending flange 16, an upper edge 18 and a curved intermediate portion 20 therebetween. The sill 14 is attached to the motor vehicle 12 in a conventional manner. The upper edge of the sill 14 is formed to include a plurality of horizontally aligned apertures slots 22, the significance of which will become apparent below. Further, in a conventional manner, the upper edge 18 of the sill 14 is concealed by a lower edge 24 of the front and rear vehicle doors 26 and 28.

The body side sill molding attachment 10 of the present invention is illustrated to generally include a main body portion 30 which longitudinally extends the length of the motor vehicle sill, a lower flange 32, an upper flange 34 and a pair of end members 36. The main body portion 30 of the body side sill attachment 10 is adapted to substantially conceal the motor vehicle sill 14 and serves to provide an aesthetically pleasing appearance below the passenger doors 26 and 28. A principal focus of the present invention concerns the attachment of the body side sill molding attachment 10 to the motor vehicle 12, including the particular structure and method employed.

In the exemplary embodiment, the lower flange 32 upwardly extends in a substantially horizontal orientation and is adapted to be positioned inwardly from the downwardly extending flange 16 of the vehicle 12. The lower flange 32 is preferably shown to include a plurality of ribs 38 extending therefrom in an outboard direction. The ribs are adapted to frictionally engage an inboard side 40 of the downwardly extending flange 16 of the motor vehicle sill 14. In one application, the plurality of spaced apart ribs 38 includes six (6) ribs 38. However, it will be appreciated by those skilled in the art that the particular number of ribs employed is largely a matter of design choice which may vary from application to application.

To provide means for attaching the upper flange 34 of the body side sill molding attachment to the vehicle 12, the upper flange 34 is illustrated to include a plurality of apertures 42. The apertures 42 are illustrated to be substantially rectangular in shape and are adapted to align with the slots 22 provided in the upper edge 18 of the motor vehicle sill 14. Upon such alignment, a fastener 44 passes through one of the apertures 42 and associated slot 22 to thereby interconnect the upper flange 34 of the body side sill molding attachment 10 and the motor vehicle sill 14.

Figure 4:
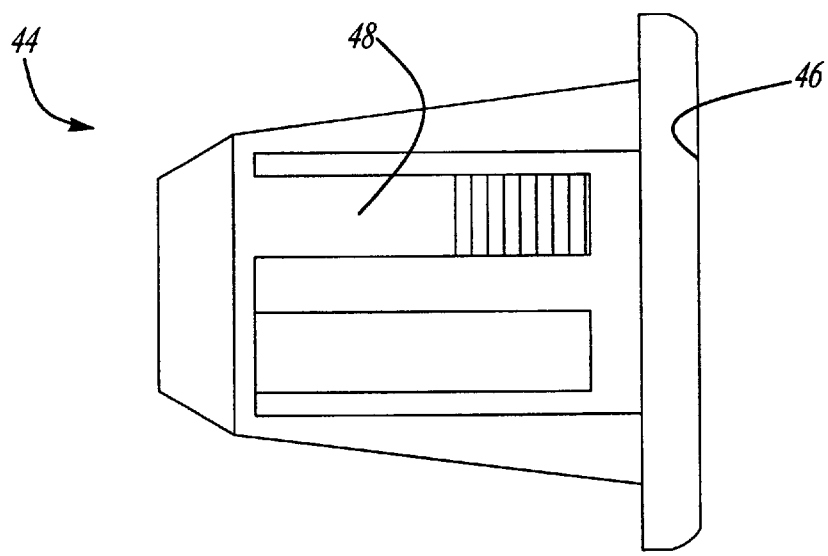
FIGS. 4 and 5 illustrate one of the fasteners used to secure the body side sill molding attachment to the motor vehicle.
Figure 5:
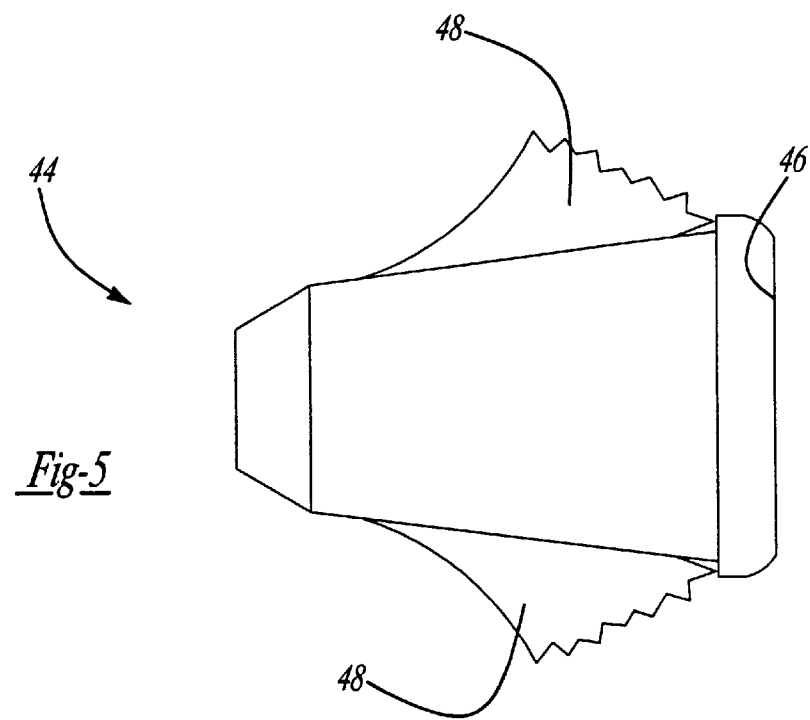

With reference to FIGS. 4 and 5, one suitable fastener 44 for use with the present invention is illustrated. The particular fastener 44 illustrated is commercially available from Emhart Automotive, Inc. of Mount Clemens, Mich. as Part No. 16105. Briefly, the fastener 44 is shown to include a head 46 and a pair of deflectably retaining members 48. The retaining portions inwardly compress upon insertion and resiliently expand thereafter to prevent inadvertent removal. It will be appreciated by those skilled in the art that a variety of other known fasteners may be employed to secure the body side sill molding attachment 10 to the motor vehicle sill 14. In this regard, the fasteners employed may be loose fasteners or may alternatively be heat staked to the body side sill molding attachment 10 or integrally formed therewith.

The end portions 36 of the body side sill molding attachment 10 operate to complete encapsulation of the motor vehicle sill 14. In this regard, the end portions extend generally perpendicular to the longitudinal axis of the vehicle and are positioned within the front and rear wheel wells. Both of the end portions 36 are provided with an aperture 50 adapted to receive a fastener (not shown) for further securement of the body side sill molding attachment 10 to the motor vehicle 12. The end portion 36 are relieved at radius in a manner well known in the art to provide flexibility for thermal expansion and build variation.

The preferred method of the present invention for attaching the heretofore described body side sill molding attachment 10 will now be described. The preferred method includes the general step of engaging the ribs 38 of the lower flange of the body side sill molding attachment 10 with an inboard side 40 of the downwardly extending flange 16 of the motor vehicle sill 14. The preferred method further includes the general step of rotating the body side sill molding attachment 10 about the downwardly extending flange 16. The shape of the molding attachment 10 and the dimensions of the motor vehicle sill 14 require the molding attachment to elastically deform slightly during rotation. Further, the preferred method of the present invention includes the general step of securing the upper flange 34 of the body side sill molding attachment 10 to the vehicle 12. Through the engagement of the lower flange 32 with the downwardly extending flange 16 of the vehicle sill 14, a reduced number of mechanical fasteners may be utilized for secure attachment of the body side sill molding attachment 10 to the motor vehicle 12. As a result, part costs and associated labor are reduced.

While the above description constitutes the preferred embodiment of the invention, it will be appreciated that the invention is susceptible to modification, variation, and change without departing from the proper scope or fair meaning of the accompanying claims.

We claim:

1. A method of attaching an exterior body side sill molding member to a vehicle having a sill with a vertically extending flange and a plurality of slots, the method comprising the steps of:

providing a one-piece body side sill molding member, said member including a body portion having first and second edges, said first edge including a longitudinally extending flange, said flange including a plurality of spaced ribs extending substantially perpendicular to its length, said second edge defining a plurality of openings to receive a corresponding plurality of fasteners;

engaging said longitudinally extending flange with said vertically extending flank;

rotating said member upward about the vertically extending flange; and securing an upper edge of said member to said body panel.

2. The method of attaching an exterior body side sill molding member to a vehicle panel of claim 1, wherein said step of securing an upper edge of said body panel to the vehicle panel includes the steps of:

providing an plurality of fasteners; and interconnecting said upper edge to the vehicle panel with said plurality of fasteners.

3. The method of attaching an exterior body side sill molding member to a vehicle panel of claim 2, wherein said step of interconnecting said upper edge to the vehicle panel with said plurality of fasteners includes the steps of:

providing a plurality of apertures in said upper edge; and passing each of said fasteners partially through an associated one of said apertures.

4. The method of attaching an exterior body side sill molding member to a vehicle panel of claim 3, wherein the step of rotating said member upward about the vertically extending flange includes the step of abutting the vehicle panel with said upper edge.

5. The method of attaching an exterior body side sill molding member to a vehicle panel of claim 4, wherein said step of rotating said member upward about the vertically extending flange includes the step of elastically deforming said body portion.

6. The method of attaching an exterior body side sill molding member to a vehicle panel of claim 1, wherein said step of engaging said longitudinally extending flange includes the step of abutting an inner side of the vertically extending flange with said plurality of spaced ribs.

7. A vehicle comprising:

a body side sill including a downwardly extending flange having an inner side;

a one-piece body side sill molding member including an upper edge and a lower edge, said lower edge being in engagement with an inner side of said downwardly extending flange and including a plurality of spaced apart ribs abutting said inner side of said downwardly extending flange, said upper edge abutting said body side sill; and means for attached said upper edge to said body side sill.

8. The vehicle of claim 7, wherein said means for attaching said upper edge to said body side sill comprises a plurality of fasteners and further wherein said body side sill includes corresponding plurality of slots each receiving an associated one of said fasteners.

9. The vehicle of claim 8, wherein said one-piece body side sill molding includes a corresponding plurality of apertures each receiving an associated one of said fasteners.

10. The vehicle of claim 9, wherein said plurality of apertures are horizontally aligned adjacent an upper edge of said molding member.

11. The vehicle of claim 7, further comprising at least one end portion extending In a lateral direction from the one-piece body side sill molding member.

12. The vehicle of claim 7, wherein said molding member is unitarily constructed of a flexible plastic material.

13. An exterior body side sill molding attachment system for a motor vehicle including a body side sill with a downwardly extending flange, the attachment adapted to encapsulate the sill, the attachment comprising:

a one-piece body side sill molding member including an upper edge and a lower edge, said lower edge being adapted to engage an inner side of said downwardly extending flange and including a plurality of spaced apart ribs adapted to abut said inner side of said downwardly extending flange, said upper edge adapted to abut said body side sill; and means for attaching said upper edge to said body side sill.

14. The exterior body side sill molding attachment system for a motor vehicle of claim 13, wherein said means for attaching said upper edge to said body side sill comprises a plurality of fasteners and further wherein said body side sill includes corresponding plurality of slots each receiving an associated one of said fasteners.

15. The exterior body side sill molding attachment system for a motor vehicle of claim 14, wherein said one-piece body side sill molding includes a corresponding plurality of apertures each receiving an associated one of said fasteners.

16. The exterior body side sill molding attachment system for a motor vehicle of claim 15, wherein said plurality of apertures are horizontally aligned adjacent an upper edge of said molding member.

17. The exterior body side sill molding attachment for a motor vehicle of claim 13, further comprising at least one end portion extending in a lateral direction from the one-piece body side sill molding member.

18. The exterior body side sill molding attachment system for a motor vehicle of claim 13, wherein said molding member is unitarily constructed of a flexible plastic material.

* * * * *